United States Patent [19]

van der Hilst et al.

[11] 3,747,938

[45] July 24, 1973

[54] APPARATUS FOR RECORDING AND/OR PLAYING BACK MAGNETIC RECORDINGS ON OR FROM A FLEXIBLE, IN PARTICULAR TAPE-SHAPED, RECORD CARRIER

[75] Inventors: Jan van der Hilst; Jacob Koorneef; Johan Adriaan Rietdijk, all of Emmasingel, Eindhoven, Netherlands

[73] Assignee: U.S. Philips Corporation, New York, N.Y.

[22] Filed: Nov. 3, 1970

[21] Appl. No.: 86,441

[30] Foreign Application Priority Data

Nov. 13, 1969 Netherlands ........................ 6917127

[52] U.S. Cl. ............................ 274/4 R, 179/100.2 P

[51] Int. Cl. ............................................ G11b 21/00

[58] Field of Search ............................. 179/100.2 P; 340/174.1 E; 274/4 R; 226/97

[56] References Cited

UNITED STATES PATENTS

| | | | |
|---|---|---|---|
| 3,336,583 | 8/1967 | Comstock | 179/100.2 P |
| 3,219,990 | 11/1965 | Goehle | 179/100.2 P |
| 3,418,434 | 12/1968 | Groenewegen | 179/100.2 P |
| 2,912,179 | 11/1959 | Schuyler | 179/100.2 Z |
| 2,950,353 | 8/1960 | Fomenko | 179/100.2 P |

*Primary Examiner*—William D. Martin, Jr.
*Assistant Examiner*—Dennis A. Dearing
*Attorney*—Frank R. Trifari

[57] ABSTRACT

An apparatus for recording and/or playing back magnetic recordings on and from a flexible tape- or disc-shaped record carrier, in which there is provided opposite the magnetic head a chamber which is connected to a source of pressure and a wall of which facing the magnetic head is constituted by a diaphragm which is movable towards the magnetic head by an excess pressure in the chamber and by means of which satisfactory contact between the record carrier and the magnetic head is achieved.

5 Claims, 1 Drawing Figure

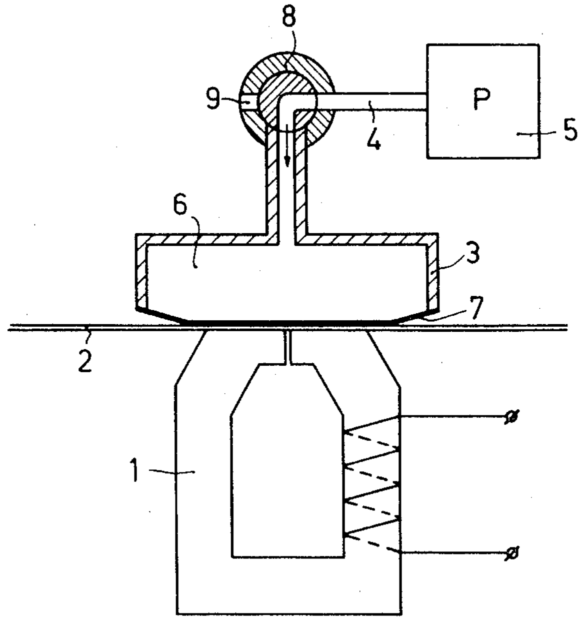
INVENTORS
JAN VAN DER HILST
JACOB KOORNEEF
JOHAN A. RIETDIJK
BY
Frank R. Trifari
AGENT

APPARATUS FOR RECORDING AND/OR PLAYING BACK MAGNETIC RECORDINGS ON OR FROM A FLEXIBLE, IN PARTICULAR TAPE-SHAPED, RECORD CARRIER

The invention relates to an apparatus for recording and/or playing back magnetic recordings on or from a flexible, in particular tape-shaped, record-carrier which apparatus is provided with at least one magnetic head past which the record-carrier is guided and with means which enable the carrier to be maintained in a position relative to the magnetic head which is desirable for faithful recording and playback.

An apparatus of this type is described in Netherlands Patent Application 6,809,372 laid open to public inspection. In this known apparatus, the said means, which are especially intended to prevent curling up of the edges of a recording tape near the magnetic head, comprises grooves which have been formed in a surface of the magnetic head which faces the recording tape and extend beneath the edges of the tape in the direction of travel of the tape and are connected to a vacuum pump. Such grooves connected to a vacuum pump have the disadvantage that they may readily become clogged by dust or dirt from the tape, from the magnetic head or from the environment so that the effect of the grooves is reduced and even may entirely be lost. In addition, the known system requires the use of a vacuum pump, and in order to ensure a constant air flow is consumed at the cost of some power.

It is an object of the present invention to avoid the said disadvantages, and an apparatus according to the invention is characterized in that the said means are constituted by a chamber which is located opposite the magnetic head and is connected to a source of pressure and has a wall portion which faces the magnetic head and is movable from a non-operative position towards the magnetic head under the influence of an excess pressure produced in the chamber by the pressure source. The steps according to the invention ensure satisfactory contact between the record carrier and the magnetic head by means of said wall portion of the pressure chamber which is arranged to be moved towards the magnetic head, preventing any fouling in the pressure chamber system. In addition, the system according to the invention consumes substantially no additional power, since there is substantially no air flow. In the absence of excess pressure in the chamber the movable wall portion is in a non-operative position, and in the case of fast forward winding and rewinding of a tape-shaped record carrier the latter, which may have at least one spliced joint, if free to move between the magnetic head and the movable pressure-chamber wall.

It should be noted that systems are known in which a recording tape is urged against a magnetic head by means of resilient cushions, for example, foamed rubber cushions, spring-baded felt cushions and the like. Such systems have the disadvantage of combining a small spring stiffness with a comparatively large mass and consequently they do not respond fast enough to rapid fluctuations due, for example, to variations in tape thickness, tape slices and the like, which in turn may result in uncontrolledly large forces or in a temporarily poor contact between the tape and the head.

It should be noted that it is known to urge a record tape to a magnetic head by means of air jets. This known method requires a large air consumption, especially when large thickness tolerances of the tape must be compensated for. As a result, in practice the contact between the tape and the head proves to be unstable in this known system. According to the invention a width dimension of the movable wall portion, when measured at right angles to the travelling direction of the tape-shaped record carrier, preferably is at least equal to the width of the record carrier. This will in particular obviate the curling of the edges of the tape.

A suitable embodiment of the invention consists in that the movable wall portion is a diaphragm. According to the invention, this diaphragm preferably is a plastics foil. It has been found that such foils will provide satisfactory engagement even at very small excess pressures of the order of 10 cm of water column. It is found that between the record carrier and the foil an air-film is formed which prevents the foil from contacting the carrier, which greatly reduces the wear of the foil. Owing to the small mass of the foil, even at a very slight excess pressure in the chamber a system is obtained which is capable of accommodating irregularities in the travelling movement of the carrier up to very high frequencies. In systems in which air is intentionally captured between the magnetic head and the carrier the spacing between the carrier and the head can be regulated by regulating the degree of the excess pressure in the pressure chamber.

In a practical embodiment of the invention the plastics foil preferably consists of Mylar about 7 $\mu$m thick.

At comparatively low speeds of the record carrier and in the case of start-stop operation the probability of an air-film being formed between the diaphragm and the carrier will be reduced, so that the diaphragm and the carrier may stick to one another. In order to obviate such a phenomenon, which frequently is referred to as the stick slip phenomenon, the invention proposes to make the diaphragm permeable to gas. Such a gas-permeable diaphragm, which may be porous or have at least one comparatively small aperture formed in it, ensures the production of an air film between the diaphragm and the carrier.

An embodiment of the invention will now be described, by way of example, with reference to the accompanying diagrammatic drawing, the single FIGURE of which is a cross-sectional view of a device according to the invention.

The FIGURE shows schematically a magnetic head 1 of an apparatus for recording and/or playing back magnetic recordings on or from a record tape 2 which is guided past the magnetic head. The surface of the tape 2 more remote from the magnetic head 1 faces a casing 3 which is connected through a conduit 4 to a vessel 5 containing a gaseous fluid, for example air, under a pressure $p$, the remainder of the casing, at least in the embodiment shown, forming an airtight chamber 6. At the side facing the magnetic head 1, the chamber 6 is closed by a diaphragm 7 made preferably of a plastics foil, for example Mylar.

The conduit 4 includes a two-way valve 8 which enables a connection to be established either between the chamber 6 and the pressure vessel 5, which connection is shown in the FIGURE, or between the chamber 6 and the ambient atmosphere (through an opening 9). In the position of the valve in which the chamber 6 communicates with the ambient atmosphere through the opening 9 atmospheric pressure prevails in the chamber and the diaphragm 7 is in an inoperative position. In this position, there is sufficient spacing between the diaphragm 7 and the record tape 2 to permit fast forward winding and rewinding of the tape, even if the latter should have spliced joints. The position of the valve 8 shown in the FIGURE in which position the chamber 6 communicates with the pressure vessel 5, is associated with either of the operating conditions "recording" and "playback" of the apparatus. In such a condition there is a pressure in the chamber 6 greater than atmospheric pressure, so that the diaphragm 7 has been moved from the inoperative position in a direction towards the magnetic head 1 so as to bring and maintain the tape 2 in a position relative to the magnetic head desired for faithful recording and playback. This position may either be a position in which the tape engages the head or a position in which the tape floats while being spaced from the head whilst there is an air-film between the tape and the head. Which of these positions the tape will assume depends, amongst other things, on the shape of the front face of the magnetic head, the tape velocity and the angle through which the tape is wound on the head, but these factors are not of essential importance to the invention.

In the operative position shown in the FIGURE there will in general be an air-film between the diaphragm and the tape, preventing the diaphragm from contacting the tape so that wear of the diaphragm and of the tape is obviated. At very low tape velocities and in the case of start-stop operation there is a likelihood of such an air-film between the diaphragm and the tape not being produced and of the diaphragm and the tape sticking together. In such a case the diaphragm preferably is permeable to air. Such a diaphragm, which may be porous or may have at least one small aperture formed in it, ensures the formation of an air-film between the diaphragm and the tape.

In particular in order to prevent curling up of the edges of the tape, the width of the diaphragm, measured at right angles to the direction of travel of the tape, i.e. the dimension of the tape measured at right angles to the plane of the drawing, is at least equal to the width of the tape. If the width of the diaphragm is made larger than the width of the tape, then - with a suitable choice of the shape of the magnetic head — the diaphragm will curve along the edges of the tape so as to engage the head, with the consequent formation of a space in which lateral leakage of the air captured between the diaphragm and the tape and between the tape and the magnetic head is prevented.

The operation of the two-way shown in the FIGURE may be coupled to the operation of the usual keys of the apparatus for setting it to the operational conditions "normal tape travel" (for recording and playback), "fast forward" and "fast rewind." It should further be noted that the two-way valve has been shown by way of example only and is not regarded as essential to the invention.

Although the invention has been described and illustrated in the drawing with reference to an embodiment in which a tape-shaped record carrier is used, it should be noted that the invention is not restricted to such a field of application but may also be used, for example, in apparatus provided with flexible disc-shaped record carriers.

What is claimed is:

1. An apparatus for recording and/or playing back magnetic recordings from a tape carrier, comprising:

A. a pressure source for supplying a fluid under pressure;

B. a magnetic head; and

C. means defining a chamber, said chamber connected to said pressure source for receiving said pressurized fluid, said chamber having a portion thereof forming a flexible wall spacing juxtaposition with and facing said magnetic head and allowing the recording tape to pass therebetween, said wall operable under the influence of said pressurized fluid to recede from said magnetic head, whereby said recording tape will caused to be positioned relatively with respect to said magnetic head.

2. The apparatus of claim 1, wherein said wall has a width which is equal to or greater than that of the tape, said wall width being measured at right angles to the passing tape.

3. The apparatus of claim 1, wherein the wall is a diaphragm.

4. The apparatus of claim 3, wherein said diaphragm comprises a plastic foil.

5. The apparatus of claim 3, wherein said diaphragm is permiable to said fluid.

* * * * *

PO-1050
(5/69)

UNITED STATES PATENT OFFICE
CERTIFICATE OF CORRECTION

Patent No. 3747938 Dated July 24, 1973

Inventor(s) Jan Van Der Hilst, Jacob Koorneef and Johan Adriaan Rietkijk

It is certified that error appears in the above-identified patent and that said Letters Patent are hereby corrected as shown below:

Column 1, line 30, before "is" should be --air--.

Claim 1, line 13, after "fluid" insert --to move toward said magnetic head, and in the absence of said pressurized fluid--.

Signed and sealed this 1st day of January 1974.

(SEAL)
Attest:

EDWARD M.FLETCHER,JR.
Attesting Officer

RENE D. TEGTMEYER
Acting Commissioner of Patents